Nov. 27, 1951      R. S. SIMONS      2,576,813
LIGHT METER
Filed June 3, 1946      3 Sheets-Sheet 1
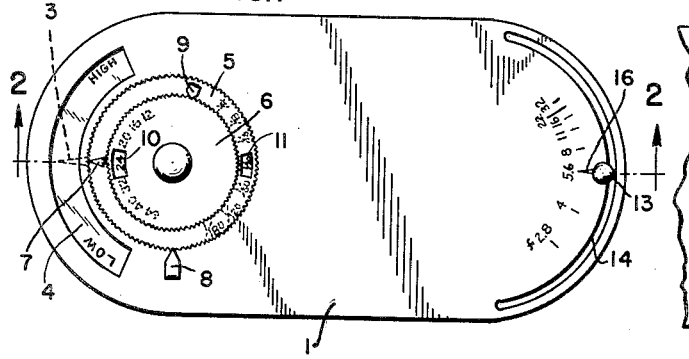
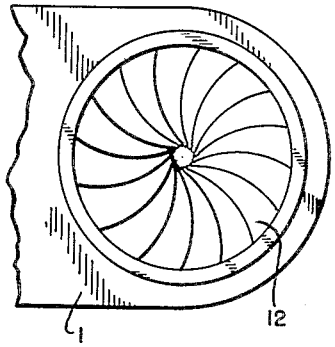
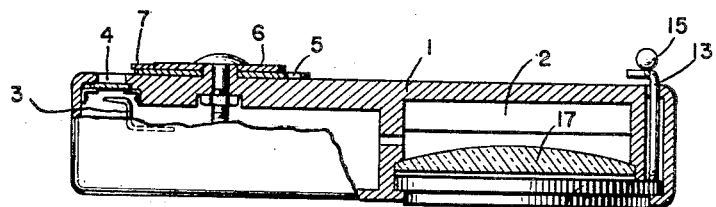
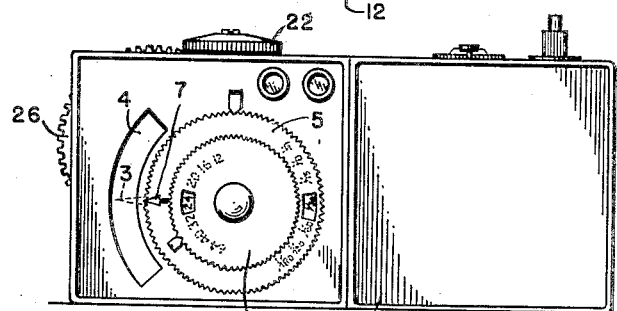
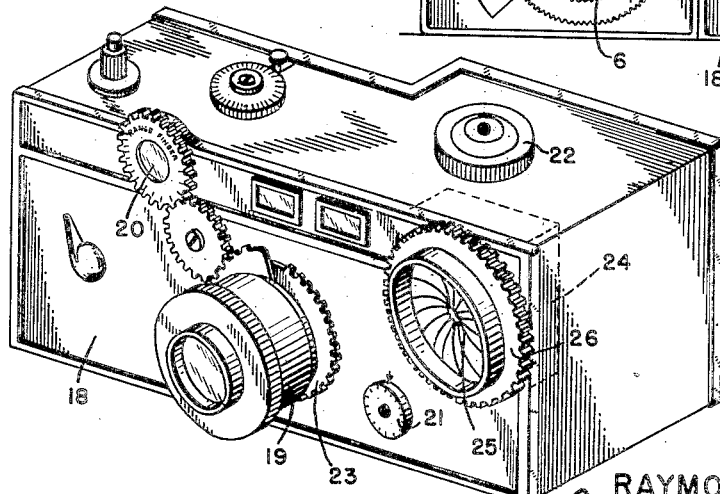
*INVENTOR.*
RAYMOND S. SIMONS
BY
ATTORNEYS Nov. 27, 1951  R. S. SIMONS  2,576,813
LIGHT METER
Filed June 3, 1946  3 Sheets-Sheet 2
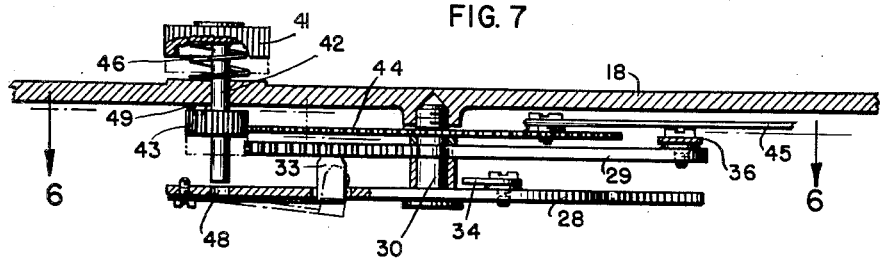
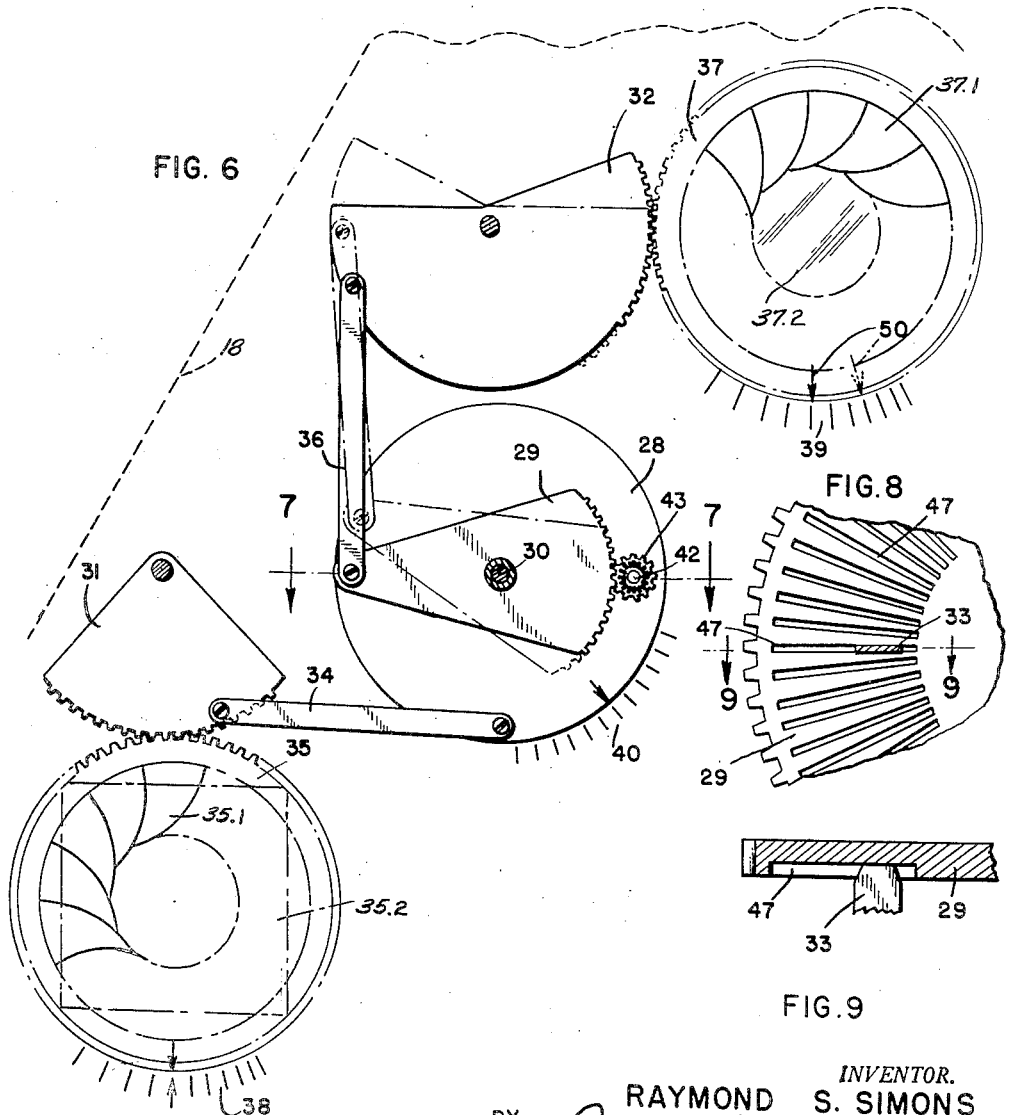
INVENTOR.
RAYMOND S. SIMONS
BY
ATTORNEYS

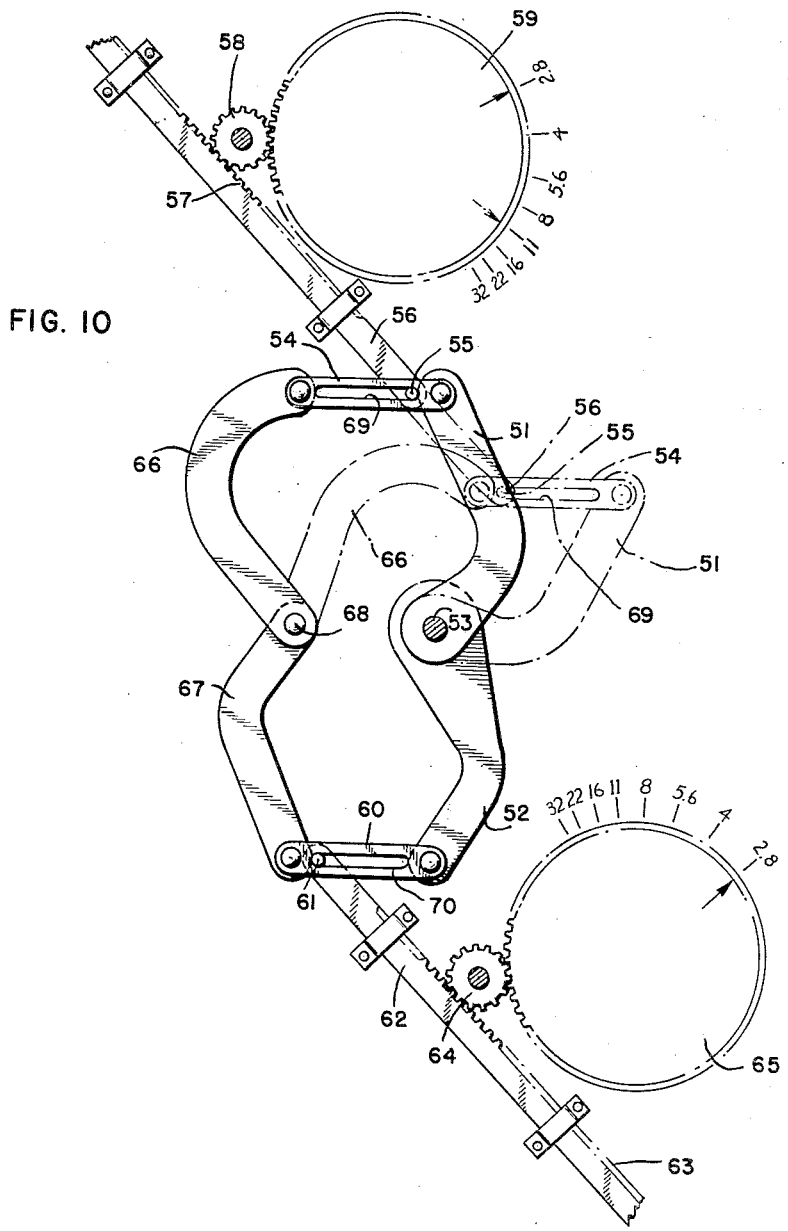

Patented Nov. 27, 1951

2,576,813

UNITED STATES PATENT OFFICE 2,576,813

LIGHT METER

Raymond S. Simons, Highland Park, Ill.

Application June 3, 1946, Serial No. 673,925

6 Claims. (Cl. 95—10)

This invention relates to devices for determining and regulating the amount of light entering a camera lens to properly expose a photosensitive emulsion suitably supported within the camera.

The main objects of this invention are to provide a device having means to regulate the amount of light falling upon a light-sensitive means to determine the optimum amount of light which, when passed through the lens of a camera, will properly expose a given photo-sensitive emulsion at a predetermined shutter speed; to provide an improved means to regulate the amount of light falling upon a light-sensitive device, which means, coupled with a camera, automatically sets the camera lens aperture to admit the optimum quantity of light for proper exposure of a predetermined photo-sensitive emulsion at a predetermined shutter speed; to provide an improved light meter and camera diaphragm coupling means which will produce a uniform density in an exposed photo-sensitive emulsion of a predetermined type under conditions of variable light intensity and shutter speed; to provide an improved adjustable coupling between the lens iris of a camera and a means to regulate the amount of light falling upon a light meter cell; to provide such a device, adjustable for various shutter speeds, which will automatically maintain proper stop relationship between two diaphragms operating in different portions of the geometric scale of diaphragm opening areas; and to provide an improved camera and light meter combination for automatically setting the lens iris of the camera for proper exposure of a predetermined photo-sensitive emulsion under varying conditions of light intensity and shutter speed.

A specific embodiment of this invention is shown in the accompanying drawings in which:

Fig. 1 is a view in elevation of a light meter having means to determine the optimum quantity of light to enter a camera lens for proper emulsion exposure.

Fig. 2 is a side view of the same partly sectioned on line 2—2 of Fig. 1.

Fig. 3 is a fragmentary view of the same in elevation showing the side opposite that shown in Fig. 1.

Fig. 4 is a perspective view showing a camera embodying the invention and including the features of the light meter shown in Fig. 1.

Fig. 5 is a rear view of the camera shown in Fig. 4.

Fig. 6 is a schematic plan view of a coupling mechanism adapted to be mounted within the camera shown in Fig. 4 to maintain constant stop relationship between the camera iris and the meter iris, each operating according to a geometric stop scale, and one of which is adjustable to operate in a different portion of the stop scale than the other. The view is as taken on line 6—6 of Fig. 7 and the broken line indicates the wall of the camera on which the mechanism is mounted.

Fig. 7 is a sectional view as taken on line 7—7 of Fig. 6 showing an arrangement for adjusting the coupling device by means of the camera shutter speed control member to vary the stop relationship of the camera iris to the meter iris in accordance with changes in camera shutter speed.

Fig. 8 is a fragmentary plan view of the inner surface of the camera iris motion transfer wheel showing a means for interlocking the same with the meter iris motion transfer wheel.

Fig. 9 is a fragmentary sectional view of the same as taken on line 9—9 of Fig. 8.

Fig. 10 is a schematic plan view of another form of coupling means to maintain constant stop relation for irises operating over different portions of like stop scales.

The present invention is primarily a means for determining and regulating the effective opening of the lens of a camera for proper exposure of a photo-sensitive emulsion, suitably carried in the camera, by regulating the amount of light reaching a light-sensitive device, according to a predetermined standard, the light-sensitive device being disposed to receive light from that area within the range of the camera lens.

The particular means herein shown and described for carrying out the purpose of the invention is intended to be embodied within the camera itself, whereby the lens iris or other means for adjusting the effective lens opening may be automatically regulated through the operation of the light meter.

As shown in Figs. 1 to 3, of the drawings, a suitable light meter for determining the optimum exposure conditions for a predetermined emulsion is embodied in a construction similar to the usual exposure meter for use independently of the camera, the device comprising a casing 1 housing a light-sensitive element or cell 2 arranged to actuate an instrument or microammeter, not shown, having suitable means to indicate light values such as the indicator or pointer arm 3, which is visible through a suitable window or aperture 4 in one face of the casing 1.

A scale of light values along the path of the needle or indicator 3 may be provided if desired. However, since it is not essential to the operation of the device, such scale of light values is purposely not shown, the only indication with respect to the range or path of the needle being the notations "low" and "high" at the respective ends of the needle path, which notations, if desired, may be etched into the glass covering usually provided in the window or aperture 4.

A pair of concentric scales 5 and 6 are disposed on the needle casing on the same side as the window 4 and are pivotedly mounted so as to be substantially concentric with the axis of movement of the needle 3. These scales carry an index 7 and serve to locate the index 7 along the path of the needle or indicator 3.

As shown, the lowermost scale 5 is held against inadvertent rotation by means of click detent 8, mounted on the meter casing; and the uppermost scale 6 is held against inadvertent movement relative to the scale 5 by means of a click detent 9 mounted on the scale 5. The scale 6 is of lesser diameter than the scale 5 and carries the index 7, which, as shown, is in the form of an arrow projecting radially from the periphery of the scale 6.

The scale 6 is provided with a suitable opening 10 through which indicia of film speeds, carried on the upper face of the scale 5, are individually visible. Similarly the scale 5 is provided with a window or aperture 11 through which indicia of shutter speeds are individually visible, such shutter speed indicia being suitably formed on the body of the casing 1 beneath the scale 5.

As will be understood by those skilled in this art, the indicia of shutter speeds and film speeds are disposed and located with respect to each other and the index 7 in accordance with a definite predetermined pattern since their relationship under any given light condition is always constant; and the relationship of the two scales with respect to the indicator 3, of the instrument actuated by the light-sensitive cell 2, is predetermined in accordance with the position of the indicator 3 as it is determined by a known or measured quantity of light energizing the light-sensitive cell 2.

Also, as will be understood, the range of the needle or indicator 3 is more or less arbitrarily selected so that the needle 3 will be at, or near, its mid-position, as shown in Fig. 1, for a light value selected as an average condition for an average film and shutter speed and an average lens aperture. For example, the instrument may be designed to indicate a range of light quantity such that the mid-position of the needle will correspond to the optimum light quantity which, passing through the camera lens, will properly expose a film having an emulsion speed of Weston 24 (daylight), at a shutter speed of 1/30 second.

The index 7 is carried by the uppermost scale 6 and, with the scales set for the before-mentioned film speed and shutter speed, the index 7 will be positioned at the aforesaid mid-position of the indicator 3 along its path of travel. Thus when the light falling upon the light-sensitive cell 2 is of such quantity as to cause the indicator 3 to register with the index 7, such quantity of light will be directly proportional to the optimum amount, which when passed through the lens of a camera at a shutter speed of 1/30 second, will properly expose a photo-sensitive emulsion having a Weston daylight speed of 24.

Likewise the location and spacing of the other indices of film or emulsion speed on the scale 5 will be correlated with other light values as measured by the position of the needle 3. Thus, for example, when the scale 6 is shifted angularly relative to the scale 5 so that another film speed, such as the slower film speed "20," shows through the window 10, the index 7 will be shifted toward the high side of the path of travel of the indicator 3 so as to require a greater amount of light on the light-sensitive cell 2 to cause the needle 3 to register with the index 7. In this case, the angular shift of the index 7 will be such that the greater amount of light required to cause registry of the indicator 3 with the index 7 will be directly proportionate to that optimum light quantity which, when passed through the lens of a camera at a shutter speed of 1/30 second, will properly expose a photo-sensitive emulsion of Weston day light speed 20.

Similarly, a change in shutter speed, applied to the light meter by appropriate angular shifting of the scale 5, will cause shifting of the index 7 to that position, along the path of the indicator 3, which will require a quantity of light to move the indicator into registry with the index 7 that will be proportionate to the optimum amount to properly expose the film emulsion at the new shutter speed condition.

As shown in Fig. 2, the light meter is provided with an opening on the opposite side of the casing 1 from the scales 5 and 6, and the indicator opening 4, for the admission of light to the light-sensitive element or cell 2, and an adjustable regulating means or iris 12 is disposed in this opening to regulate the amount of light that may fall upon the cell. The iris 12 is actuated by means of a lever 13, extending through a slot 14 in the opposite side of the casing 1, and provided with a nob or other suitable formation 15 for operation by the user's finger. Thus by manipulation of the lever 13, the iris 12 can be opened and closed to vary, or control, the amount of light passing through the iris to the light-sensitive cell 2. As shown in Fig. 1, the lever 13 terminates in a pointer 16, and a scale "f" opening indices is disposed along the path of the pointer 16.

It will be understood that the "f" opening scale will be calibrated with respect to the cell 2, and the instrument or microammeter actuated by the cell, so that under any given light condition, the amount of light passing through the iris 12 to the cell 2 at any of the indicated "f" openings along the path of the pointer 16, will be exactly proportionate to the amount of light which, passing through a camera lens having its iris set at the same "f" opening as indicated by the pointer 16 on the light meter, will be the optimum for correct exposure under given emulsion and shutter speed conditions.

Thus, by setting the scales 5 and 6 to a given or predetermined condition of film speed and shutter speed; then holding the light meter so that the photo-sensitive cell receives light from the area within the range of the camera lens, when the camera is positioned to photograph the desired scene or subject matter; and then adjusting the meter iris 12 by means of the lever 13 so as to regulate the effective opening of the iris and amount of light affecting the photo-sensitive cell 2, to cause the indicator 3 to register with the index 7, the pointer 16 will indicate the proper "f" opening at which the camera iris must be set for proper exposure under the given or predetermined conditions.

As shown in Fig. 2, a diffuser 17 may be disposed between the meter iris 12 and the light-sensitive cell 2 to cause uniform distribution of light upon that area of the cell exposed through the opening of the iris 12.

The invention as it may be embodied in a camera is shown in Figs. 4 to 10 inclusive. The camera may be of any suitable design and, as shown, comprises a casing 18 having a telescopingly focusing lens mount 19, including the usual lenses, a range finder 20 suitably coupled to the lens mount for direct focusing adjustment thereof, a shutter speed regulating means 21 and a film winding means 22. The lens mount will also include the usual lens opening regulating means, or iris diaphragm, not shown, suitably arranged for operation by an iris adjustment or control ring 23, shown at the rear end of the mount.

As shown, the light-sensitive cell 24 of the light meter is housed within the camera casing at a suitable location in the forward part thereof, and the light meter iris 25 is suitably mounted in an opening in the camera casing leading to the light-sensitive cell 24. In this arrangement, light meter iris controling ring 26 projects somewhat beyond the end of the camera casing, and is provided with external gear teeth to facilitate manipulation by the user's fingers.

Details of the lens mount construction and the construction of the lens and meter irises are not shown since suitable arrangements of known devices can be readily made by those having ordinary skill in this art. Also, it will be understood that suitable indicies of various "f" or stop openings will be applied to a stationary part of the camera casing, or the lens mount, and that an appropriate mark or index registering with the "f" opening indices will be provided on the respective iris control ring whereby the actual "f" or stop opening will be indicated to the user.

The instrument actuated by the light-sensitive cell 24 may be appropriately housed within the camera casing at the rear part thereof, as shown in Fig. 5. From this figure, it will be observed that the needle or indicator 3 of the instrument, which is actuated by the light-sensitive cell 24 is visible through the window 4 in the camera casing and that the dials 5 and 6 which determine the position of the index 7 are pivotedly mounted on the outside of the camera casing in a position substantially concentric with the axis of the needle or indicator 3 in the same manner as in the light meter illustrated in Fig. 1.

Thus all the elements of the entire light meter shown in Figs. 1 to 3, inclusive, are embodied in the camera, with the exception that the camera casing 18 serves the purpose of the meter casing 1, and the relative location of the instrument and its indicator with respect to the light-sensitive cell and the meter iris has been altered to accommodate the device to the camera structure.

When embodied in a camera, as shown in Figs. 4 and 5, the operation of the light meter is the same as though the light meter were used as an exposure meter, like the device of Fig. 1. In the camera, however, the meter iris is positively coupled to the lens iris so that the setting of the lens iris to the proper "f" opening is accomplished automatically as the meter iris is adjusted to align the instrument indicator 3 with the semi-fixed index 7.

As is well known to those skilled in the photographic art, the shutter speed and the "f" opening or aperture of the lens, controlled by the shutter, bear a direct relationship with each other for any given light condition. Thus, with a given light condition, if the lens iris opening setting of "f 8" is proper for a shutter speed of 1/50 second, then with a shutter speed of 1/25 second, the "f" opening of the lens iris must be one stop less or "f 11." Likewise, if the shutter speed is to be changed from 1/50 to 1/200 second, with no change in light condition, the lens iris stop or "f" opening must be two stops larger or "f 4" for proper exposure of a given emulsion.

In either of these cases, however, since there is no change in light conditions, the "f" stop or opening indication on the meter iris would be unchanged, and remain at "f 8," unless the dial 5, and hence the index 7, is shifted in accordance with the changed shutter speed conditions. However, since the shutter speed and the "f" opening relationship of the lens diaphragm always bear a constant relationship for any given light condition, the shutter speed regulating mechanism may be utilized, in conjunction with the coupling means between the meter iris and the lens iris, to affect a change in the stop opening relation of the two irises thereby obviating the need or use for the dial 5 and leaving the index 7 in its predetermined position for the speed of the particular emulsion used in the camera. The coupling arrangement, which may be readily incorporated within the camera structure by those of ordinary skill in the art, is illustrated in Figs. 6 to 10, inclusive, of the drawings.

The meter and lens iris coupling arrangement shown in Figs. 6 to 9, inclusive, comprises a pair of concentric motion transfer members 28 and 29 pivoted on a common axis 30, and linked respectively to the meter iris operating means 31 and the camera or lens iris operating means 32, for positive driving connection of the members 31 and 32, so that they may be operated one by the other. The motion transfer members 28 and 29 are keyed together for mutual rotary movement, in unison, about the pivot 30 by means of a spring actuated dog 33, shown in Fig. 7, which normally locks the members together.

As shown in Fig. 6, the motion transfer member 28 is connected to the meter iris operating means 31 by a link or arm 34, having pivoted connection between the two members, the iris operating means 31, as shown, being a gear segment drivingly meshed with the toothed iris operating ring 35 which operates the iris 35.1 associated with the meter 35.2 indicated by a dotted outline. Likewise, the motion transfer member 29 is connected to the camera iris operating means 32 by a link or arm 36 pivotedly connected between the members, the operating means 32 being also shown as a suitable gear segment meshed with the toothed operating ring 37 of the camera iris 37.1 which is associated with the lens 37.2. The mechanism is illustrated in this manner to facilitate discussion of its operation, and it will be understood that each of the operating means 31 and 32 for the meter and camera irises may comprise the respective iris operating ring itself, since the most direct connection between the motion transfer members, and the respective irises is preferable.

The heart of the mechanism resides in the operating connection and relationship of the members 28 and 31 and 29 and 32, as will be hereafter explained, and the actual location or disposition of the meter and camera irises is immaterial so long as the chain of connection between them is positive. Therefore, for the sake of discussion, the iris operating means 31 and 32 may be considered as the iris diaphragm control rings, and the rings 35 and 37 may be considered as a directly operated means for indicating the relative positions of the irises with respect to their stop opening scales, designated by the numerals 38 and 39 respectively.

As before indicated, the purpose of the coupling mechanism herein disclosed is to translate the progressively varying motion of the meter iris operating means 31, with respect to a geometrically proportioned stop opening scale, into a substantially uniform arithmetic motion in the motion transfer members 28 and 29, with respect to a scale designated by the numeral 40 of unitary or equal parts of angular displacement, and then to reconvert the equal or uniform movement of the motion transfer members into a progressively varying motion in the lens iris operating member 32, which operates according to the geometric scale 39; and to provide a means whereby the camera or lens iris operating means 32 can be shifted, simultaneously with any change in shutter speed, to work in a different range of the scale 39 than the meter iris operating means 31 works with respect to its geometric scale 38.

Such translation of progressively varying or unequal angular movement to equal angular movement and reconversion from equal movement to progressively varying or unequal movement, is obtained through the application of the principles of simple harmonic motion and is accomplished by providing the links or arms 34 and 36 of less length, between their pivots, than the distance between the axes of the elements which they respectively connect; and locating the pivot connection on each iris operating means so that it will be on a radius thereof that is perpendicular to a line between the axes of rotation of the motion transfer members and the said iris operating means when the latter is at one end of its geometric scale of angular movement.

The length of the link or arm and the radial distance of its pivot connection on the motion transfer member, from the axis thereof, are preferably such that, between the limits of its movement, the pivot connection on the motion transfer member will move an equal angular distance on either side of a radial line that is normal to a line between the axes of the transfer member and the respective iris operating means.

Thus, since the motion transfer members 28 and 29 are normally keyed together for mutual rotation, and when the iris control members 31 and 32 are positioned so that the respective irises operate in identical portions of their respective stop opening scales, any motion in the meter iris operating means 31 will be exactly duplicated in the camera iris operating means 32.

In order to permit adjustment of the camera or lens iris control means so that the camera iris can operate in a different range of its geometric scale 39 than the meter iris, to automatically correct the relationship of the meter and camera irises for changes in shutter speed, provision is made to shift the camera iris motion transfer member 29, angularly, relative to the meter iris motion transfer member 28. Such shifting of the iris relationship is preferably accomplished at the time the shutter speed is changed and by means of the shutter speed regulating device.

As shown in Fig. 7, the shutter speed regulating means 41, which is the same as the speed regulating means 21 shown in Fig. 4, is mounted fast on the end of a shaft 42, which extends through and is journalled on the camera casing 18, and which carries a gear 43 disposed on the inside of the camera casing.

The motion transfer members 28 and 29 are free to rotate on the pivot-shaft 30, which may be suitably mounted on the camera casing; and a gear 44 having a pivotally connected arm 45 for adjusting the speed of the shutter, not shown, is also mounted on the pivot-shaft 30, but between the motion transfer members and the camera casing so as to mesh at all times with the gear 43.

As shown, the shaft 42 is axially slidable in its journal on the camera casing so that the gear 43 may be meshed with the transfer member 29 by pushing the shutter speed regulating nob 41 inwardly. Normally the speed regulating nob 41 is held in an outward position by means of a spring 46 bearing between the nob 41 and the camera casing so that the gear 43 is in a position disengaged from the motion transfer member 29.

As shown in Fig. 7, the spring actuated dog 33 which keys the motion transfer members 28 and 29 together, is mounted on the underside of the transfer member 28 and the dog 33 extends upwardly through a suitable aperture in the transfer member 28 so that it can engage in the slots 47 formed in the underside of the transfer member 29, as shown in Figs. 8 and 9. In order to disengage the dog 33 from the transfer member 29, the shutter speed regulating shaft 42 is extended beyond the gear 43 so that in its normal disengaged position, it will terminate just above the surface of the transfer member 28, and an opening 48 is provided in the transfer member 28 just above the spring arm carrying the dog 33, so that when the shaft 42 is pushed inwardly to engage the gear 43 with the transfer member 29, the end of the shaft 42 will bear against the spring arm of the dog 33 and cause the dog to become disengaged from the transfer member 29. In this inward position any turning of the speed regulating nob 41 will cause the transfer member 29 to also turn and shift its angular relation with the transfer member 28.

The gear 43 on the shutter speed control shaft 42 is preferable of a size such that 360° of rotation of the speed adjusting nob 41 will shift the transfer member 29 the full extent of its angular movement to shift the camera iris control means from one end of its operating scale to the other. Thus the entire periphery of the speed adjusting nob 41 may be used to carry a scale, not shown, of shutter speeds.

It will be understood that the shutter speed scale will be so arranged that an average shutter speed will be indicated when the camera iris and the meter iris are each at an arbitrarily established point or mid-point, with relation to the perspective stop scales. For example, the indicated shutter speed may be $1/50$ second when the camera iris and the meter iris are each at the stop position or opening of "f 8." It will also be understood that the shutter speed mechanism will be so designed that a change of speed from $1/50$ to $1/25$ or $1/100$ of a second will shift the transfer member one unit of angular distance so as to cause a shift of the camera iris one stop in the appropriate direction, or a change of speed from $1/50$ to $1/12$ or $1/200$ of a second will shift the transfer member 29 and the camera iris two units or two stops in the appropriate direction on the iris scale.

With this arrangement of the shutter speed regulating means, the gear 43 can only turn to shift the transfer member 29, when the shaft 42 has been pushed inwardly to such an extent as to disengage the dog 33 from the transfer member 29; and in order to establish a base point from which the coupling mechanism is to be adjusted, the aperture 48, through which the shaft 42 is projected to disengage the dog 33, is located so as to register with the shaft 42 only when the meter iris is set at its predetermined base point, for example, "f 8." Thus the transfer member 28 is held in a fixed position during adjustment and shifting of the transfer member 29, and the parts are always held in proper relation to the shutter speed scale since the gear 43 and shaft 42 are immediately disengaged from the motion transfer members when the desired speed change has been accomplished and the regulating nob 41 is released, the spring 46 normally urging the speed regulating nob 41 to disengaged position.

In order to prevent inadvertent rotation of the shutter speed regulating nob 41, when in its disengaged position, a dog 49, fast to and projecting from the inner side of the camera casing, is disposed to engage in suitable slots formed in the upper surface of the gear 43 in a manner similar to that shown in Figs. 8 and 9.

With this arrangement for the iris coupling mechanism, the camera iris is automatically adjusted to the proper stop differential relative to the meter iris to accommodate any change in shutter speed. Thus, the position of the index 7 of the light meter, relative to the path of movement of the instrument indicator 3, need not be changed for variations in shutter speed: and all that is necessary, in the operation of the improved camera is to bring the indicator 3 into registry with the index 7, in order to cause the proper opening of the camera iris for the particular light conditions under which the photograph is being taken. The camera iris opening will change one stop for each stop change of the meter iris opening regardless of the part of the stop opening scale in which the camera iris may be operating.

A typical iris stop differential is illustrated in Fig. 6 wherein the position of the camera iris operating means and the motion transfer member 29 is shown in dotted outline for a shift of three stops of the camera iris relative to the meter iris, as would be occasioned by a change of shutter speed from 1/200 second to 1/25 second, the new position of the camera iris relative to the stop scale 29 being indicated by the dotted arrow 50.

Another arrangement of coupling means for accomplishing a constant stop relationship between the camera iris and the meter iris, regardless of the portion of the stop scale in which the camera iris may be operating, is schematically illustrated in Fig. 10. In this arrangement, the principles of simple harmonic motion for transforming a variable angular movement into a uniform angular movement are also employed.

As shown in Fig. 10, the motion transfer members comprise a pair of diametrically opposed arms 51 and 52, pivotedly mounted on a common axis 53 and releasably connected together for movement in unison about the axis 53. The arm 51 which operates the camera lens iris carries a link 54 having a sliding connection with a connecting pin 55 mounted on the iris operating means, or rod 56, which is supported in fixed guides for straight line reciprocating motion. The rod 56 is provided with rack teeth 57 which engage an idler gear 58 meshed with the operating ring of the lens iris 59. Likewise the arm 52 carries a link 60 arranged for sliding connection with a pin 61 extending from a rod 62 mounted to reciprocate in fixed guides and having a rack 63 which drives an idling gear 64 having driving engagement with the operating ring for the meter iris 65.

As shown, the ends of the links 54 and 60, opposite their connection with the arms 51 and 52, are pivotedly connected to a second pair of arms 66 and 67 which are pivoted on a fixed axis 68, and which are operatively parallel with the arms 51 and 52, and the sliding connection with the pins 55 and 61 of the iris operating rods 56 and 62 is obtained by providing each of the links 54 and 60 with a longitudinal slot 69 and 70, respectively.

The axis 68 of the arms 66 and 67 is spaced a predetermined distance from the pivot 63, and the spacing of the pivot connections of the links 54 and 60 is the same. Thus, each pair of arms 51, 66 and 52, 67 will swing together as opposite sides of a parallelogram.

As shown, the arms 51 and 52 are arranged to swing through an arc of substantially 90°, and in order to accomplish this extent of angular movement, each of the arms 51 and 52, as well as the parallel arms 56 and 57, are given a somewhat hooked or dog-leg shape in order that the arms can clear the pivots 63 and 68. Thus, as the arms 51 and 52 swing through their arcuate movement, they will draw the iris operating rods 56 and 62 along a straight line path, and each unit length of movement of the iris control rods along a uniform scale, from one extreme to the other, will be in exact accordance with each of the varying units of angular movement of the respective irises along a geometric scale of iris opening areas.

In order that the lens iris may operate in a different portion of its geometric scale than the meter iris, the arm 51 may be released from its driving connection with the arm 52 and shifted angularly relative to the arm 52, according to the change in stop relationship between the iris 59 and the iris 65 occasioned by changes in shutter speed, as in the case of the device shown in Figs. 6 and 7. Also the means, not shown, for effecting change of the angular relationship of the motion transfer arms 51 and 52, may be arranged to operate at the same time that the shutter speed regulating mechanism is operated. Such shifted relation of the coupling members for a stop differential between the lens and meter irises is shown in dotted outline in Fig. 10.

It will be understood, however, that the mechanism will be arranged so that any change in the relationship of the arms 51 and 52 will be made when the meter iris is in a predetermined, or medial, position such, for example, as at the opening "f 8," as in the case of the mechanism shown in Figs. 6 and 7.

The main advantages of this invention reside in the simple, direct and precise determination of the correct stop opening of the iris diaphragm of a camera for the optimum exposure of a given emulsion under substantially any condition of shutter speed and subject lighting.

Other advantages lie in the direct adjustment of the camera iris diaphragm for changes in light conditions through regulation of the amount of light falling upon a light-sensitive device in accordance with a predetermined index of optimum exposure requirement; and in the automatic imposition of an optimum differential in the stop opening relation of a pair of positively coupled iris diaphragms in a camera upon any change in the shutter speed of the camera.

Although several embodiments of this invention have been herein shown and described, it shall be understood that numerous details of the constructions shown may be altered or omitted without departing from the spirit of this invention as defined by the following claims.

I claim:

1. The combination with a camera having a lens, a shutter speed control means, and an iris adjustable to a geometric scale to vary the effective lens opening, of a light meter comprising a light sensitive cell arranged to receive light from that area within the range of said lens, an instrument actuated by said cell and having means to indicate light values, a second iris adjustable to a geometric scale arranged to regulate the amount of light reaching said cell, means to directly adjust said second iris manually, coupling means connected between said lens iris and said second iris for positive mutual operation thereof in accord with their respective geometric scales, said coupling means including a pair of relatively rotatable members normally connected together for operation in unison, means associated with said shutter speed control means adapted to interconnect said shutter speed control means and said coupling means and directly vary the angular relation of said coupling members to each other for adjustment of said lens iris with respect to its geometric scale proportionate to change in shutter speeds, and means for disconnecting said coupling members from each other upon operation of said shutter speed control means.

2. In a camera having a lens, a shutter speed regulating means, a lens iris, a light meter, and a light meter iris, means for directly adjusting said meter iris manually, a coupling operatively connecting said lens iris and said meter iris and comprising a pair of motion transfer members connected together for mutual angular movement in unison about a common axis, a link arm having driving connection between the meter iris and one of said transfer members and adapted to transform a progressively varying angular movement of the meter iris into a substantially uniform angular movement in said motion transfer members, a second link arm having driven connection between the other transfer member and the lens iris and adapted to transform the uniform angular movement of said transfer members into progressively varying angular movement in said lens iris, driving means actuated by said shutter speed regulating means adapted to shift the operative position of one of said transfer members angularly relative to the other and proportionately with change of shutter speed, and means on said driving means for disconnecting said transfer members from each other upon operation of said shutter speed regulating means.

3. In a camera having a lens, a lens iris, a light meter, and a light meter iris, each of said irises having a rotary operating part, a coupling means positively connecting said lens iris and said meter iris for mutual operation one by the other and comprising a pair of concentrically pivoted motion transfer members, one of said members being operatively linked to said meter iris and the other of said members being operatively linked to said lens iris, the link means including link arms respectively connecting said members to the rotary parts of said lens and meter irises, and each of said link arms being of less length than the distance between the axis of said members and the axis of the rotary part to which it is connected, releasable means adapted to operatively connect said members together for mutual rotative movement in unison, and means adapted to shift one of said members angularly relative to the other upon release of said releasable means.

4. In a camera having a lens, a lens iris, a light meter, and a light meter iris, each of said irises having a rotary operating part, a coupling means positively connecting said lens iris and said meter iris for mutual operation one by the other comprising a pair of concentrically pivoted motion transfer members, an arm pivoted eccentrically on one of said members and having driving connection with the rotary part of said meter iris, a second arm pivoted eccentrically on the other of said members and adapted to drive the rotary part of said lens iris, each of said arms being of less length than the distance between the axis of said members and the axis of the rotary part to which it is respectively connected, means adapted to connect said motion transfer members together for mutual rotation in unison, and means adapted to shift the operative position of one of said transfer members angularly relative to the other.

5. In a camera having a lens, a shutter speed regulating means, a lens iris, a light meter, and a light meter iris, each of said irises having a rotary operating part, a coupling means positively connecting said lens iris and said meter iris for mutual operation one by the other and comprising a pair of concentrically pivoted motion transfer members, one of said members being operatively linked to said meter iris and the other of said members being operatively linked to said lens iris, the link means including link arms respectively connecting said members to the rotary parts of said lens and meter irises, and each of said link arms being of a less length than the distance between the axis of said members and the axis of the rotary part to which it is connected, means adapted to connect said motion transfer members together for mutual rotation in unison, and means actuated by said shutter speed regulating means adapted to shift one of said transfer members angularly relative to the other proportionately with change of shutter speed.

6. In a camera having a lens, a lens iris, a shutter speed regulating means, a light meter, and a light meter iris, means for directly adjusting said meter iris manually, a coupling positively interconnecting said lens iris and said meter iris for mutual operation one by the other and comprising a rotative element having a link arm in driving connection with the meter iris and adapted to transform geometrically progressing units of angular movement in the meter iris into substantially uniform units of movement in said rotative element, a second rotative element positively driven by the first and having a link arm in driving connection with the lens iris adapted to transform said uniform movement of the rotative elements into geometrically progressing units of angular movement in said lens iris, and drive means actuated by said shutter speed regulating means adapted to connect with one of said rotative elements and vary the angular relation of said one rotative element with respect to the other proportional to change in shutter speed, said drive means including means for disconnecting said rotative elements from each other during operation of said shutter speed regulating means.

RAYMOND S. SIMONS.

(References on following page)

References Cited

The following references are of record in the file of this patent:

UNITED STATES PATENTS

| Number | Name | Date |
|---|---|---|
| 1,990,361 | Bailey | Feb. 5, 1935 |
| 2,013,363 | Riszdorfer | Sept. 3, 1935 |
| 2,043,901 | Mihalyi | June 9, 1936 |
| 2,143,500 | Smethurst et al. | Jan. 10, 1939 |
| 2,194,031 | Riszdorfer | Mar. 19, 1940 |
| 2,213,749 | Strauss | Sept. 3, 1940 |
| 2,278,338 | Tonnies | Mar. 11, 1942 |
| 2,285,761 | Tonnies | June 9, 1942 |
| 2,292,623 | Farrier | Aug. 11, 1942 |
| 2,464,559 | Davenport et al. | Mar. 15, 1949 |

FOREIGN PATENTS

| Number | Country | Date |
|---|---|---|
| 427,476 | Great Britain | Apr. 16, 1935 |
| 329,506 | Italy | Sept. 11, 1935 |